UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF OBTAINING TITANIC OXID.

1,206,798.   Specification of Letters Patent.   Patented Dec. 5, 1916.

No Drawing.   Application filed March 7, 1916.   Serial No. 82,560.

*To all whom it may concern:*

Be it known that I, LOUIS E. BARTON, a citizen of the United States, residing at Niagara Falls, in the county of Niagara and State of New York, have invented certain new and useful Improvements in Methods of Obtaining Titanic Oxid, of which the following is a specification.

My present invention relates to the obtaining of titanic oxid concentrates from titaniferous and ferruginous substances, such, for example, as ilmenite ores, and more particularly to such methods for so doing as are disclosed in Letters Patent granted to Auguste J. Rossi and myself, Nos. 1,106,409 and 1,106,410, dated August 11, 1914, and No. 1,171,542, dated February 15, 1916.

The objects of my present invention comprise provision of novel steps in the practice of such, or similar, methods whereby their final products are attainable more readily and economically and of more desirable quality for certain purposes.

Reference to the said Letters Patent will disclose the methods, processes, and products therein described and claimed, the which may, for the purposes of this specification, be summarized as follows, viz: The titaniferous-ferruginous substances treated, such, for example, as ordinary titaniferous, or ilmenite, ores, were melted in the presence of sulfid of an alkali metal, either charged as such, or produced by reactions in the charge, during its melting, from therewith-mixed carbonaceous material and sulfate of an alkali metal. The resulting melts containing ferro sodium sulfid and titanate of an alkali metal were cast in molds purposely shallow to accelerate cooling and thus solidified into solid, and quite homogeneous masses. These, so cast, products were then crushed and preferably after, or without, lixiviation with water, heated in a bath containing sulfuric, or hydrochloric, acid so dilute as to dissolve the therein iron, and other, compounds, rather than those of titanium. Since which, as per my invention for which I am filing application for Letters Patent cotemporaneously herewith either sulfurous acid, or chlorin, has at this stage of the processes been, in some cases, substituted for sulfuric or hydrochloric acids in the bath. The insoluble residues being withdrawn from the bath, are washed, dried, and, if desired, calcined, the resulting, usually powdered, products being, prior to calcination, darkish to light gray in color, or, if calcined, yellowish, and distinguished, by analysis, as consisting principally of titanic oxid, the percentage of which was somewhat increased by calcination, and as containing also some soda and sulfuric anhydrid, and a relatively small quantity of iron oxid; one of the most notable and distinguishing characteristics of said products being the exceptional ease, rapidity, and completeness with which they are soluble in concentrated sulfuric, or other, acid.

My present improvement is based upon my discovery that by properly selecting and proportioning the ingredients of the melted charges, and permitting gravity time to act sufficiently therein before their solidification, they will separate into two different layers, or zones, the uppermost of which will contain the most of the iron compounds present and the lowermost the most of the desired titanium compounds. This being due to their comparative specific gravities in the forms produced by said proper selection, proportioning, and melting thereof together as per the said procedures. This affords opportunity for a very considerable mechanical separation, in advance of the chemical concentration in the bath, and results not only in reducing cost of operation, but also in superior final titanic oxid products. The said uppermost layer of the melt consisting, for the most part, of ferro sodium sulfid, may be regarded as the "matte," and the lowermost layer, consisting principally of said titanium compounds, as the slag, or titanium concentrate resulting from my method.

My invention is practised as follows: The charge having been molten as aforesaid, I retain it in molten state sufficiently to enable gravity to effect the specified separation of the molten constituent. The aforesaid different groups of materials respectively constituting the said layers, I then physically separate from each other, either by tapping them respectively out of the furnace from suitable different levels, or successively, as will be understood by those skilled in the art. If, on the other hand, it is preferred to pour the entire melt at once, then, in that case, I take pains to regulate the cooling of the castings, as by molds so much deeper, than wide, as to allow time for gravity to effect the desired separation in the molds before solidification. In the latter case, the said matte will be found to be comparatively brittle and is easily broken away from its underlying titanium concentrate, which is comparatively hard and tough. The thus removed matte may be dumped, or readily and cheaply converted into useful by-products, whereas the therefrom segregated titanium concentrate requires but comparatively little labor and expenditure of chemicals in order to yield, as per said patented processes, a superior titanic oxid concentrate.

In the practice of my improvement I prefer to use niter cake (substantially sodium bi-sulfate) as the sulfate of an alkali metal agent of the melt. Its superiority, for my purpose, over other forms of alkali sulfate, such as salt cake, or neutral sodium sulfate, I attribute to its comparatively greater content of sulfur which facilitates formation in the melt of that type of ferro-sodium sulfid which most readily and completely separates from the other constituents. I have also discovered that the desired separation is more perfect if the niter cake and titaniferous ferruginous material be more thoroughly and homogeneously incorporated with each other as by heating them together in advance of the furnacing. To this end, I first melt the niter cake at about 165° C. in an open iron vessel. To this melt I add the said material, pulverized to about 100 mesh, and then heat the charge at from 175° C. to 250° C. until its stiffening indicates near-completion of the following reaction, viz:

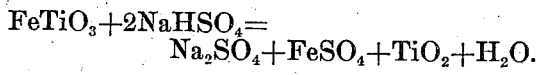

$$FeTiO_3 + 2NaHSO_4 = Na_2SO_4 + FeSO_4 + TiO_2 + H_2O.$$

After this I add the carbonaceous reducing agent and mix it with the charge.

I believe that by the said preliminary heating the sulfur is more firmly chemically combined and therefore less thereof lost in the subsequent melting. An additional advantage attributable to the aforesaid preliminary heating is that, during it, the combined water is evolved from the niter cake, instead of while in the furnace.

As regards the proportions of the furnace charge, I have found that the best results are attainable from about the following, viz: Titaniferous-ferruginous material 100 parts by weight, niter cake 200 parts by weight, carbon 40 parts by weight.

For better understanding I append the following results of an actual operation of my improvement, viz:

Weight of casting_____ 130.75 lbs.
Upper layer—"matte"__ 62.50 lbs. 47.7%
Lower layer—titanium concentrate_____ 68.50 lbs. 52.3%

Specific gravity of matte 2.75; specific gravity of titanium concentrate 3.09.

Analysis.

| | Matte. | Titanium concentrate. |
|---|---|---|
| Titanic oxid | 6.24% | 45.43% |
| Iron (Fe) | 30.97 | 5.81 |
| Sulfur | 34.35 | 6.29 |
| Sodium (Na) | 24.88 | 22.18 |

My said preliminary titanium concentrate I then treat the same as the melts of the previous processes referred to, i. e. in an acid,—or chlorin,—containing bath, and after the therein reactions, withdraw, wash, dry and, if desired, calcine, the undissolved residues thereby converting them into the desired final titanic oxid products.

Having now described my invention, what I claim as new and desire to secure by Letters Patent is the following, viz:

1. The method of obtaining titanic oxid from a substance containing it and iron oxid, which comprises heating said substance in presence of sulfid of an alkali metal until formation of ferro sodium sulfid and titanate of the alkali metal, and separating the melt into two parts, the one containing more of the titanium and less of the iron compounds than the other.

2. The method of obtaining titanic oxid from a substance containing it and iron oxid, which comprises heating said substance in presence of sulfid of an alkali metal until formation of ferro sodium sulfid and titanate of the alkali metal; segregating respective constituents of the melt by aid of gravity into two vertically-in-sequence layers, or zones, the lowermost containing more of the titanium and less of the iron compounds than the uppermost; and separating of such layers from the remainder of the melt.

3. The method of obtaining titanic oxid from a substance containing it and iron oxid, which comprises heating said substance in presence of sulfid of an alkali metal until formation of ferro sodium sulfid and titanate of the alkali metal; pouring the resulting melt into a mold, cooling it at such rate as, by aid of gravity, to, before solidification, segregate respective constituents of the casting into two, vertically-in-sequence, layers, or zones, the lowermost containing more of the titanium and less of the iron compounds than the uppermost, and, after solidification, separating of such layers from the remainder of the casting.

LOUIS E. BARTON.

Witnesses:
B. C. POTTER,
T. C. GRAHAM.